US009442026B2

United States Patent
Mol (10) Patent No.: US 9,442,026 B2
(45) Date of Patent: Sep. 13, 2016

(54) LOAD SENSING ON A BEARING

(75) Inventor: Hendrik Anne Mol, Sleeuwijk (NL)

(73) Assignee: AKTIEBOLAGET SKF, Gothenburg (DE)

( * ) Notice: Subject to any disclaimer, the term of this patent is extended or adjusted under 35 U.S.C. 154(b) by 942 days.

(21) Appl. No.: 13/702,433

(22) PCT Filed: Jun. 7, 2010

(86) PCT No.: PCT/EP2010/003405
§ 371 (c)(1),
(2), (4) Date: Feb. 15, 2013

(87) PCT Pub. No.: WO2011/154016
PCT Pub. Date: Dec. 15, 2011

(65) Prior Publication Data
US 2013/0211742 A1    Aug. 15, 2013

(51) Int. Cl.
*G01L 5/00* (2006.01)
*G01L 1/06* (2006.01)
*F16C 41/00* (2006.01)
*G01L 1/00* (2006.01)
*G01L 3/00* (2006.01)

(52) U.S. Cl.
CPC ............... *G01L 1/06* (2013.01); *F16C 41/00* (2013.01); *G01L 5/0019* (2013.01); *Y02B 10/30* (2013.01)

(58) Field of Classification Search
CPC .............................. G01L 3/109; G01L 5/0047
USPC ..................................................... 702/41–43
See application file for complete search history.

(56) References Cited

U.S. PATENT DOCUMENTS

| 4,203,319 | A | | 5/1980 | Lechler | |
| 4,341,122 | A | * | 7/1982 | Lechler | G01L 5/0019 73/862.045 |
| 4,667,521 | A | * | 5/1987 | Fuss | G01B 7/16 73/862.541 |
| 5,140,849 | A | | 8/1992 | Fujita et al. | |
| 5,698,788 | A | | 12/1997 | Mol et al. | |
| 5,952,587 | A | * | 9/1999 | Rhodes | F16C 19/364 73/862.541 |

(Continued)

FOREIGN PATENT DOCUMENTS

EP    0877242 A2    11/1998

OTHER PUBLICATIONS

H. Glockner Force-Monitoring Bearings for Machine Tool Spindles SKF Ball Bearing Journal vol. 225, 1985, pp. 19-24.

(Continued)

*Primary Examiner* — John Breene
*Assistant Examiner* — Jeremy Bishop
(74) *Attorney, Agent, or Firm* — Bryan Peckjian; SKF USA Inc. Patent Dept.

(57) ABSTRACT

The mechanical load on a rolling element bearing is determined from the deformation of the rolling element bearing. The local deformation caused by the rolling contact forces is used to determine an average contribution to the mechanical load in order to average out the effect on the deformation as a result of the spread in diameter of the rolling elements of the bearing. The global deformation of the rolling element bearing is determined to calculate a dynamic contribution to the mechanical load. The dynamic contribution takes into account the variations of the mechanical load on the relevant time-scales that have been omitted from the average contribution as a result of the averaging operation. The total mechanical load is the sum of the average contribution and the dynamic contribution.

12 Claims, 4 Drawing Sheets

(56) References Cited

U.S. PATENT DOCUMENTS

| | | |
|---|---|---|
| 7,389,701 B2 | 6/2008 | Mol |
| 7,444,888 B2 | 11/2008 | Mol et al. |
| 2008/0091361 A1* | 4/2008 | Pecher .................. G01L 5/0019 702/41 |
| 2012/0014632 A1* | 1/2012 | Nishikawa ............ G01L 5/0019 384/448 |

OTHER PUBLICATIONS

D. Frase SKF Ball Bearing Journal vol. 240, 1992, pp. 2-9 Bearings Which Reveal Their Loads.

J.A. Wensing on the Dynamics of Ball Bearings PhD Thesis, Univ. Twente, The Netherlands, Dec. 1998, ISBN 90-36512298.

* cited by examiner

LOAD SENSING ON A BEARING

CROSS-REFERENCE

This application is the U.S. national stage of International Application No. PCT/EP2010/003405 filed on Jun. 7, 2010.

FIELD OF THE INVENTION

The invention relates to a machine comprising a rolling element bearing, a sensor system and a load determining system for determining a mechanical load on the rolling element bearing. The invention also relates to a load determining system for use in such a machine, to software for implementing such a load determining system, and to a method of determining a mechanical load on a rolling element bearing.

BACKGROUND OF THE INVENTION

Load sensing technology is a technology to determine a load carried by a certain structure or a machine, or by a component thereof. The structure, machine or component is then provided with one or more load sensors. For example, the machine is an automobile and the individual loads on individual ones of the wheels are determined via the wheel hubs. The information about the loads is used to electronically control, e.g., the amount of power supplied to each driven wheel individually, or the amount of braking applied to each individual wheel, or to adjust the suspension system for each wheel individually, in order to improve the vehicle's road handling. Load sensing technology is also used in, e.g., payload weight measurements on machines such as trucks for bulk transport, warehouse trolleys, household washing machines, conveyor belts, elevators, cranes and hoisting equipment, etc. Load sensing technology is also used in condition monitoring or operational control of machines such as, e.g., wind turbines, industrial equipment, marine propulsion systems, aeronautic propulsion systems, etc.

A specific branch of load sensing technology relates to physically integrating the one or more load sensors with a rolling-element bearing. The load on the rolling element bearing causes an elastic deformation of the rolling element bearing. The deformation is sensed by one or more strain sensors accommodated at the rolling element bearing. The load is determined from the elastic deformation as sensed.

U.S. Pat. No. 7,444,888, issued to Hendrik Anne Mol and Gerrit Cornelis van Nijen, and incorporated herein by reference, discloses a method and sensor arrangement for determining a contact force vector acting on a rolling element bearing in operation. As known, a rolling element bearing comprises an inner ring, an outer ring and a plurality of rolling elements accommodated between the inner ring and the outer ring. Examples of rolling elements are balls, cylindrical rollers, needle rollers, and tapered rollers. Sensor signals are received from a plurality of sensors measuring performance characteristics of the rolling element bearing. The received sensor signals are processed to determine the contact force vector. The plurality of sensors are arranged to measure a bearing component deformation, and the step of processing comprises the step of determining the contact force vector using an inverse transformation of a finite element analysis model which describes the rolling element bearing. The finite element analysis model is simplified using at least one generalized-mode shape, the at least one generalized-mode shape being a mathematical description of a natural or elementary mode deformation of a component of the rolling element bearing, such as the inner ring or the outer ring.

The technology disclosed in U.S. Pat. No. 7,444,888 is based on measuring a deformation of the inner ring and/or of the outer ring of the rolling element bearing. The deformation is brought about by the rolling contacts between the rolling elements on the one hand, and the inner ring and/or outer ring on the other hand, while the rolling element bearing is being subjected to a load. The deformation is measured while the inner ring and the outer ring of the rolling element bearing are moving relative to each other. Each specific one of the sensors supplies a specific sensor signal indicative of the local deformation of the inner ring or of the outer ring at the location of the specific sensor. The local deformation changes dynamically as a result of the repetitive passing of rolling contact forces (also referred to as "Hertzian contact forces").

The repetitive passing of the rolling contact forces is characterized by the ball-pass frequency. The expression "ball-pass frequency" refers to the number of rolling elements that pass the location of the sensor per unit of time. The specific sensor signal reflects this repetitive character. The amplitude of the specific sensor signal is considered proportional to the load on the rolling element bearing. Measuring the amplitude gives therefore information about the load on the rolling element bearing. For more background information see, e.g., SKF Ball Bearing Journal Vol. 225, 1985, pp 19-24 or SKF Ball Bearing Journal Vol. 240, 1992, pp 2-9.

U.S. Pat. No. 7,389,701, issued to Hendrik Anne Mol and incorporated herein by reference, discloses a method and sensor arrangement for determining a load vector acting on a rolling element bearing in operation. The expression "load vector" refers to the complete load vector: three orthogonal force components and two moments. The rolling element bearing comprises an inner ring, an outer ring and multiple rolling elements that are accommodated between the inner ring and the outer ring. A plurality of N sensors are provided, which measure displacement and/or strain for determining displacement and/or strain in, e.g., the inner ring or the outer ring. Furthermore, a mode-shape coefficients calculator is provided, connected to the plurality of N sensors, for determining a deformation of the inner ring or the outer ring by calculating amplitude and phase of N/2 Fourier terms representing at least one radial mode shape of the inner ring or the outer ring.

The technology disclosed in U.S. Pat. No. 7,389,701 considers the rolling element bearing as a physical object that deforms elastically under load. The deformation is approximated by a linear combination of generalized mode shapes. According to component mode synthesis (CMS), the generalized mode shapes can be described according to the approach discussed in J. A. Wensing, "On the dynamics of ball bearings", PhD thesis, Univ. Twente, The Netherlands, December 1998, ISBN 90-36512298. Each respective one of the generalized mode shapes has a respective amplitude and a respective phase that are determined from the sensor signals. A data processor, a neural network or another type of associative memory, receives an input representative of the amplitudes and the phases as determined from the sensor signals, and supplies an output representative of the current load.

Accordingly, U.S. Pat. No. 7,444,888, SKF Ball Bearing Journal Vol. 225, 1985, pp 19-24, or SKF Ball Bearing Journal Vol. 240, 1992, pp 2-9, teach that the mechanical load on a rolling element bearing can be determined from the amplitude of a sensor signal that is indicative of the repetitive local deformation of the inner ring or the outer ring as a result of the rolling contacts (Hertzian contacts). The repetitive local deformation is brought about by a rolling element that is passing the location where the local deformation is being measured.

In practice, however, the amplitude of the sensor signal is somewhat different per different one of the passing rolling elements. A reason for this is the following. Consider the very high value of the hardness of the inner ring or of the outer ring in the region where they are in physical contact with the rolling elements (e.g., 100 N/µ indicating that a force of 100 N is required to create a deformation of 1µ), and also consider the miniscule spread in diameter of the rolling elements (accuracy in the order of, e.g., 5µ for a ball in a typical mass-produced ball-bearing). Accordingly, the amplitude of the sensor signal representative of the passing of a rolling element may vary by 10% among the rolling elements although the load on the rolling element bearing remains the same.

The accuracy of the magnitude of the mechanical load, as determined by the approach discussed in, e.g., U.S. Pat. No. 7,444,888, SKF Ball Bearing Journal Vol. 225, 1985, pp 19-24 or SKF Ball Bearing Journal Vol. 240, 1992, pp 2-9, can be improved by considering the amplitudes during a larger number of revolutions of the rolling element bearing in order to average out the fluctuations that are not caused by the load externally applied on the rolling element bearing. This averaging is implemented by means of, e.g., removing the DC-component from the sensor signal in order to produce a waveform, rectifying the waveform and then applying a low-pass filter to the rectified waveform so as to equalize the amplitudes to a mean value. The cut-off frequency of the low-pass filter is chosen so as to have each one of the rolling elements passing at least once the location of the deformation sensor within the characteristic time-constant of the low-pass filter. That is, the characteristic time-constant is made dependent on the speed of revolution, at which the inner ring and the outer ring of the rolling element bearing are rotating with respect to each other. For example, in a rolling element bearing whose inner ring is rotating at, say, 4 revolutions per second with respect to the outer ring, each of the rolling elements is completing its circuit around the inner ring at half that speed, i.e., every half second. The cut-off frequency of the low-pass filter is then chosen in the order of 1 Hz, so as to average over about two complete laps around the circuit. If the cut-off frequency is set to ½ Hz, the averaging is performed over about four complete laps.

Accordingly, the cut-off frequency of the low-pass filter is tuned under control of the speed of rotation of the inner ring relative to the outer ring so as to be able to achieve an accurate representative of the mechanical load on the rolling element bearing.

The accuracy of the load, as determined by considering the repetitive local deformations driven by the passing of the rolling elements, implies that variations in the actual mechanical load on the rolling element bearing with frequencies higher than the cut-off frequency are not accounted for, as these have been attenuated by the low-pass filter. For example, the suspension system of a wheeled vehicle has an eigen-frequency in the range of 2 Hz-7 Hz in order to effectively manage the typical, varying forces transmitted from the road surface to the chassis of the traveling vehicle. In above example of the 1 Hz cut-off frequency, these dynamically varying contributions to the mechanical load are not taken into account. The load determined by averaging the repetitive deformations, driven by the passing of the rolling elements, is therefore referred to in the remainder of this text as "the average contribution" to the mechanical load. The relevant contribution to the mechanical load, which is characterized by frequencies higher than the cut-off frequency of above low-pass filter, is referred to in this text as "the dynamic contribution".

In order to determine the dynamic contribution, the approach can be used of, e.g., U.S. Pat. No. 7,389,701, discussed above. That is, the dynamic contribution is determined by considering the one or more signal components of the global deformation of the rolling element bearing that have a timescale associated with frequencies higher than the cut-off frequency of the low-pass filter discussed above.

In order to determine the dynamic contribution, the sensor signals considered in determining the global deformation need to be filtered so as to remove the signal components that have already been taken into account in the determining of the average contribution. Accordingly, a high-pass filter is needed with a cut-off frequency that, for all practical purposes, equals the cut-off frequency of the low-pass filter used in the determining of the average contribution. This ensures that the average contribution to the load and the dynamic contribution to the load, in a frequency range which contains the common cut-off frequency, can be summed without introducing severe errors as a result of duplicating or omitting contributions falling within this frequency range. The high-pass filtering also removes the contributions to a global deformation of the rolling element bearing that are driven by thermal effects, such as caused by friction, as thermal effects have a characteristic timescale of many seconds. Also, the sensor signals considered in determining the global deformation need to be filtered so as to remove the signal components with frequencies in the order of the ball-pass frequency and above. Accordingly, a further low-pass filter is applied that has a cut-off frequency higher than the cut-off frequency of the high-pass filter but lower than the ball-pass frequency, in order to remove the latter signal components. The cut-off frequency of the further low-pass filter is taken as, e.g., 10 Hz in above example relating to the suspension system of the wheeled vehicle. The local elastic deformations occurring at the ball-pass frequency as a result of the passing of the rolling elements are considered a disturbance superimposed on the global elastic deformation. In above example, the global deformation is calculated using the deformation components in the frequency range between 1 Hz and 10 Hz. The local deformation caused by the passing of the rolling elements is picked-up via the carrier frequency (i.e., the ball-pass frequency) and demodulated with a bandwidth of 1 Hz. The system designer now has to find an acceptable compromise between the desired filter properties and the desired error rejection rate. The sharper a filter is, the more ringing is found. As known, removing the high-frequency components from a signal causes undesired oscillations ("ringing") in the time-domain as a result of the ripples in the sinc-function being the time domain response of a perfect low-pass filter to a step function. A compromise is, for example, to use a second-order or a fourth-order Butterworth filter. One could also use an approach disclosed in U.S. Pat. No. 5,698,788 issued to Hendrik Anne Mol and Cornelis van Nijen, and assigned to SKF. U.S. Pat. No. 5,698,788 discloses a method for analyzing regularly recurring mechanical vibrations. The method comprises the steps of plotting an amplitude/time spectrum associated with the vibrations, dividing the amplitude/time spectrum into time intervals shorter than the shortest time lapse between two consecutive excitations, subjecting those parts of the amplitude/time spectrum defined by each time interval to a Fourier transformation in order to obtain an amplitude/vibration-frequency interval spectrum associated with each time interval, and subjecting those amplitudes in each amplitude/vibration frequency interval spectrum associated with certain vibration frequencies to a Fourier transformation in order to obtain an excitation-frequency spectrum associated with the respective vibration frequency. Effectively, the high-pass filter and the further low-pass filter form a band-pass filter.

The idea is therefore the following. The DC-component is removed from the one or more sensor signals used for determining the average contribution to the load, using as input the amplitude of the local deformation driven by the rolling contact forces. The remaining AC-components are rectified and then averaged in a low-pass filter before being further processed to determine the average contribution to the load. The sensor signals, used for determining the dynamic contribution to the load using the global deformation, are subjected to a band-pass filter before being further processed. The cut-off frequency of the low-pass filter and the lower one of the cut-off frequencies of the band-pass filter are set to be substantially equal. The cut-off frequencies of the low-pass filter and of the band-pass filter are controlled in dependence on the speed of revolution of the inner ring and the outer ring of the rolling element bearing relative to one another. The load is then determined as the sum of the average contribution and the dynamic contribution.

SUMMARY OF THE INVENTION

More specifically, the invention relates to a machine comprising a rolling element bearing, a sensor system and a load determining system. The rolling element bearing comprises an inner ring, an outer ring and a plurality of rolling elements accommodated between the inner ring and the outer ring. The sensor system is configured for sensing a local deformation of at least a particular one of the inner ring and the outer ring at at least a specific location on the particular one of the inner ring and the outer ring, and for supplying a sensor output representative of the sensing. The load determining system is configured for receiving the sensor output from the sensor system, and for determining a mechanical load on the rolling element bearing in dependence on the sensor output, when the inner ring and the outer ring are coaxially rotating relative to one another. The load determining system comprises a first signal processing path, a second signal processing path and a combiner. The first signal processing path is configured for processing the sensor output for determining an average contribution to the mechanical load. The second signal processing path is configured for processing the sensor output for determining a dynamic contribution to the mechanical load. The combiner is configured for linearly combining the average contribution and the dynamic contribution. The first signal processing path is configured for low-pass filtering the sensor output with a first cut-off frequency; and for processing the low-pass filtered sensor output as representative of the local deformation induced by a passing of the rolling elements past the specific location so as to determine the average contribution indicative of a low-frequency variation in the local deformation. The second signal processing path is configured for band-pass filtering the sensor output with a second cut-off frequency, substantially equal to the first cut-off frequency, and with a third cut-off frequency higher than the second cut-off frequency. The second signal processing path is also configured for processing the band-pass filtered sensor output as representative of a global deformation of the rolling element bearing indicative of the dynamic contribution. The first cut-off frequency, the second cut-off frequency and the third cut-off frequency are substantially lower than the ball-pass frequency.

The first signal processing path processes the sensor output as representative of the local deformations induced by the passing of the rolling elements for determining an average contribution to the mechanical load. The signal processing in the first signal processing path is based on, e.g., the approach discussed in U.S. Pat. No. 7,444,888 discussed above, or SKF Ball Bearing Journal Vol. 225, 1985, pp 19-24 or SKF Ball Bearing Journal Vol. 240, 1992, pp 2-9, both referred to above. The second signal processing path processes the sensor output as representative of the global deformation of the rolling element bearing, i.e., of the global deformation of the particular one of the inner ring and the outer ring, for determining a dynamic contribution to the mechanical load. The processing in the second signal processing path is based on the approach discussed in, e.g., U.S. Pat. No. 7,389,701 discussed above, or J. A. Wensing, "On the dynamics of ball bearings", PhD thesis, Univ. Twente, The Netherlands, December 1998, ISBN 90-36512298, referred to above. The total force or the total mechanical load on the rolling element bearing is then determined by summing the average contribution and the dynamic contribution.

The sensor system may comprise a first sensor and a second sensor, different from the first sensor. The sensor output may then comprise a first sensor signal supplied by the first sensor and a second sensor signal supplied by the second sensor. In an embodiment, the first sensor signal is then supplied to the first signal processing path but not to the second signal processing path, whereas the second sensor signal is supplied to the second signal processing path but not to the first signal processing path. The configuration of the first sensor and/or its position with respect to the rolling element bearing may then be optimized for sensing the local deformation stemming from the rolling-contact forces. The configuration of the second sensor and/or its position with respect to the rolling element bearing may then be optimized for sensing the global deformation of the rolling element bearing.

In an embodiment of the machine, the first sensor signal and the second sensor signal are identical, e.g., supplied by one and the same sensor at the same moment. The sensor signal is then supplied both to the first signal processing path for determining the average contribution and to the second signal processing path for determining the dynamic contribution to the load.

In a further embodiment of the machine, the load determining system has an input for receiving a speed signal representative of a ball-pass frequency of the rolling element bearing in operational use of the machine. The load determining system controls the first cut-off frequency, the second cut-off frequency and the third high cut-off frequency in dependence on the ball-pass frequency.

This further embodiment is relevant in case the speed, at which the inner ring and the outer ring of the rolling element bearing are rotating relative to each other, varies during operational use of the machine. The average contribution to the mechanical load on the basis of the repetitive local deformations may then need to average out the sensor output by considering the amplitudes of the absolute values of the local deformations over multiple completed laps of each rolling element around the stationary one of the inner ring and the outer ring of the rolling element bearing. The timescale over which the averaging is performed, and therefore the first cut-off frequency, is then made dependent on the ball-pass frequency, i.e., on the relative speed of revolution. The second cut-off frequency is substantially equal to the first cut-of frequency and is, therefore, also made dependent on the ball-pass frequency. The third cut-off frequency is to be set well below the ball-pass frequency and is, therefore, also made dependent on the ball-pass frequency.

The load determining system can be implemented in a variety of manners, e.g., in its entirety in hardware, or in software on a general-purpose computer, or as a combination thereof. Above embodiments cover the commercial exploitation of a machine having a rolling element bearing, a sensor system and being equipped with a load determining system.

The invention can also be commercially exploited as a load determining system for determining a mechanical load on a rolling element bearing, the load determining system being configured for use with a rolling element bearing and a sensor system. As different types of rolling element bearing deform differently under a same mechanical load and as different types of deformation sensors are available to sense the deformation of the rolling element bearing, the load determining system can be supplied as a generic building block that is programmable in the field to function with different types of rolling element bearings and with different types of sensor systems. Alternatively, the load determining system is configured for use with a specific type of rolling element bearing and/or a specific type of sensors.

The invention can also be commercially exploited as a combination of a load determining system and a sensor system, for use with a rolling element bearing. The load determining system is then configured for use with the specific sensor system of the combination.

The invention can also be commercially exploited as a combination of a rolling element bearing and a load determining system as specified above. In this case, the load determining system is supplied as a dedicated component specifically configured for use with the rolling element bearing of the combination and, as an option, being programmable for use with different sensor systems.

The invention can also be commercially exploited as a combination of a rolling element bearing, a load determining system and a sensor system. This combination is relevant, for example, in case the sensor system is physically integrated with the rolling element bearing. The combination is then commercially exploited as an entity wherein, e.g., the load determining system and the sensor system have been optimized for use with one another and with the rolling element bearing in the combination.

The invention further relates to software on a computer-readable medium, the software being configured for execution on a computer for implementing a load determining system. The load determining system is configured for determining a mechanical load on a rolling element bearing, which has an inner ring, an outer ring and a plurality of rolling elements accommodated between the inner ring and the outer ring. The mechanical load is determined when the inner ring and the outer ring are coaxially rotating relative to one another. The load determining system is operative to determine the mechanical load under control of a sensor system, configured for sensing a local deformation of at least a particular one of an inner ring and the outer ring at at least a specific location on the particular one of the inner ring and the outer ring and for supplying a sensor output representative of the sensing. The software comprises first instructions for implementing a first signal path configured for processing the sensor output for determining an average contribution to the mechanical load; second instructions for implementing a second signal path configured for processing the sensor output for determining a dynamic contribution to the mechanical load; and third instructions for implementing a combiner for linearly combining the average contribution and the dynamic contribution. The first instructions comprise fourth instructions for implementing a low-pass filtering of the sensor output with a first cut-off frequency; and fifth instructions for implementing a processing of the low-pass filtered sensor output as representative of the local deformation induced by a passing of the rolling elements past the specific location so as to determine the average contribution indicative of a low-frequency variation in the local deformation. The second instructions comprise sixth instructions for implementing a band-pass filtering of the sensor output with a second cut-off frequency, substantially equal to the first cut-off frequency, and with a third cut-off frequency higher than the second cut-off frequency; and seventh instructions for implementing a processing of the band-pass filtered sensor output as representative of a global deformation of the rolling element bearing indicative of the dynamic contribution. The first cut-off frequency, the second cut-off frequency and the third cut-off frequency are substantially lower than the ball-pass frequency.

Accordingly, the invention can be commercially exploited as software for programming a general-purpose computer to determine the mechanical load under control of the deformation as sensed.

In an embodiment of the software the sensor system comprises a first sensor and a second sensor, different from the first sensor. The first sensor supplies a first sensor signal and the second sensor supplies a second sensor signal. The sensor output comprises the first sensor signal and the second sensor signal. The first sensor signal is processed by the second instructions and the second sensor signal is processed by the first instructions.

In a further embodiment of the software, the sensor system comprises a sensor for supply of a sensor signal. The sensor output comprises the sensor signal. The sensor signal is processed by the first instructions and by the second instructions.

Advantages of supplying one or more sensor signals to the first signal processing path and one or more other sensor signals to the second signal processing path have been discussed briefly above. Advantages of supplying one or more sensor signals to both the first signal processing path and the second signal processing path have been mentioned above as well.

A further embodiment of the software comprises eighth instructions for receiving a speed signal representative of a ball-pass frequency of the rolling element bearing; and ninth instructions for control of the first cut-off frequency, the second cut-off frequency and the third high cut-off frequency in dependence on the ball-pass frequency. An advantage of the dependency of the cut-off frequencies on the rotating speed has been explained above.

The invention further relates to a method of determining a mechanical load on a rolling element bearing. The rolling element bearing comprises an inner ring, an outer ring and a plurality of rolling elements accommodated between the inner ring and the outer ring. The method comprises: sensing a local deformation of at least a particular one of the inner ring and the outer ring at least a specific location on the particular one of the inner ring and the outer ring for generating a sensor output representative of the sensing; and determining the mechanical load on the rolling element bearing in dependence on the sensor output when the inner ring and the outer ring are coaxially rotating relative to one another. The determining of the mechanical load comprises processing the sensor output for determining an average contribution to the mechanical load; processing the sensor output for determining a dynamic contribution to the mechanical load; and linearly combining the average contribution and the dynamic contribution. The determining of the average contribution comprises low-pass filtering the sensor output with a first cut-off frequency; and processing the low-pass filtered sensor output as representative of the local deformation induced by a passing of the rolling elements past the specific location so as to determine the average contribution indicative of a low-frequency variation in the local deformation. The determining, of the dynamic contribution comprises band-pass filtering the sensor output with a second cut-off frequency, substantially equal to the first cut-off frequency, and with a third cut-off frequency higher than the second cut-off frequency; and processing the band-pass filtered sensor output as representative of a global deformation of the rolling element bearing indicative of the dynamic contribution. The first cut-off frequency, the second cut-off frequency and the third cut-off frequency are substantially lower than the ball-pass frequency.

In an embodiment of the method in the invention, the sensor system comprises a first sensor and a second sensor, different from the first sensor. The first sensor supplies a first sensor signal and the second sensor supplies a second sensor signal. The sensor output comprises the first sensor signal and the second sensor signal. The processing of the sensor output for determining the average contribution comprises processing the second sensor signal, and the processing of the sensor output for determining the dynamic contribution comprises processing the first sensor signal.

In a further embodiment of the method, the sensor system comprises a sensor for supply of a sensor signal. The sensor output comprises the sensor signal. The processing of the sensor output for determining the average contribution comprises processing the first sensor signal and second sensor signal. The processing of the sensor output for determining the dynamic contribution comprises processing the first sensor signal and the second sensor signal. A context for these embodiments has been given above.

A further embodiment of the method of the invention comprises receiving a speed signal representative of a ball-pass frequency of the rolling element bearing, and controlling of the first cut-off frequency, the second cut-off frequency and the third high cut-off frequency in dependence on the ball-pass frequency. An advantage of the dependence of the cut-off frequencies on the rotating speed has been discussed above.

BRIEF DESCRIPTION OF THE DRAWINGS

The invention is explained in further detail, by way of example and with reference to the accompanying drawing, wherein.

Throughout the Figures, similar or corresponding features are indicated by same reference numerals.

DETAILED DESCRIPTION OF THE INVENTION

Figure 1:
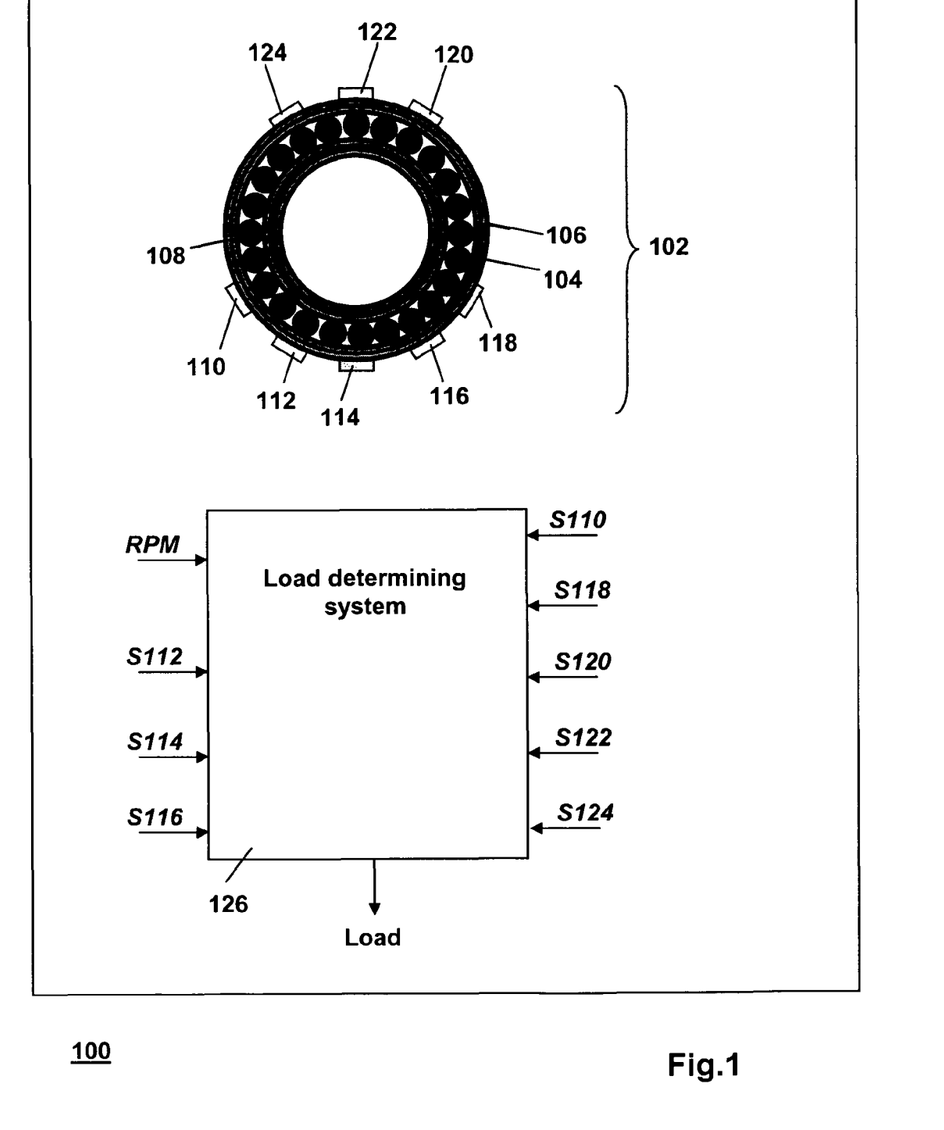
FIG. 1 is a block diagram of a machine in the invention.

FIG. 1 is a diagram of a machine 100 that comprises a rolling element bearing 102, a sensor system and a load determining system 126. The bearing 102 is installed as a functional part the machine 100 that is, e.g., a vehicle, a wind turbine, a piece of industrial equipment, an elevator, etc. For example, the rolling element bearing 102 is mounted so as to maintain a position of a shaft relative to a housing, while enabling the shaft to rotate freely around its axis with respect to the housing. In order to not obscure the drawing, the other parts of the machine 100 have not been drawn.

The rolling element bearing 102 comprises an inner ring 104 and an outer ring 106 that are positioned coaxially. The rolling element bearing 102 further comprises a plurality of rolling elements located between the inner ring 104 and the outer ring 106. In order to not obscure the drawing, only a single one of the plurality of the rolling elements has been indicated with a reference numeral 108. The plurality of rolling elements is typically accommodated in a so-called cage (not shown) that is configured for holding the rolling elements in position relative to one another. In operational use of the rolling element bearing 102, the inner ring 104 is mounted so as to be stationary with respect to a first physical part (not shown) of the piece of machinery, e.g., a shaft, and the outer ring 106 is mounted so as to be stationary with respect to a second physical part (not shown) of the piece of machinery, e.g., a housing of a device for driving the shaft, such as an engine or an electric motor. The plurality of rolling elements enables the inner ring 104 and, therefore, the first physical part, to freely rotate relative to the outer ring 106 around their common axis and, therefore relative to the second physical part.

In operational use of the machine 100, the rolling element bearing 102 is subjected to a mechanical load, i.e., to forces and/or torques applied to the rolling element bearing 102 via the first and second physical components. The applied forces or torques locally affect the equilibrium distance between the atoms or molecules making up each of the inner ring 104, the outer ring 106 and the plurality of rolling elements of the rolling element bearing 102. The rolling element bearing 102 deforms until the inter-molecular or inter-atomic forces are large enough to resist the applied forces or torques. If the applied forces and torques are such, that the inner ring 104, the outer ring 106 and the rolling elements, among which rolling element 108, assume their original shape after the applied forces and torques are removed, the deformation is referred to as an elastic deformation.

The load sensing system 126 is configured for determining a mechanical load on the rolling element bearing 102 on the basis of sensing the elastic deformation of the rolling element bearing 102, e.g., the elastic deformation of the inner ring 104 and/or of the outer ring 106.

The deformation, or: strain, of the rolling element bearing 102 can be determined, e.g., by means of strain sensors, such as strain gauges. It is known how to derive information about the mechanical load from the measured strain. See, e.g., U.S. Pat. Nos. 7,444,888 and 7,389,701, referred to above. In the machine 100, the rolling element bearing 102 is provided with a sensor system. The sensor system comprises, e.g., a first strain sensor 110, a second strain sensor 112, a third strain sensor 114, a fourth strain sensor 116, a fifth strain sensor 118, a sixth strain sensor 120, a seventh strain sensor 122 and an eighth strain sensor 124. In the example shown, the outer ring 106 is stationary with respect to a housing of the rolling element bearing 102. The plurality of strain sensors is therefore accommodated at the outer surface of the outer ring 106 so as to be able to connect the plurality of strain sensors via wires (not show) to the load determining system 126. Where on the inner ring 104 and/or the outer ring 106 to mount the first strain sensor 110, the second strain sensor 112, the third strain sensor 114, the fourth strain sensor 116, the fifth strain sensor 118, the sixth strain sensor 120, the seventh strain sensor 122 and the eighth strain sensor 124 is a matter of design choice.

In operational use of the machine 100, the first strain sensor 110 supplies a first sensor signal S110, the second strain sensor 112 supplies a second sensor signal S112, the third strain sensor 114 supplies a third sensor signal S114, the fourth strain sensor 116 supplies a fourth sensor signal S116, the fifth strain sensor 118 supplies a fifth sensor signal S118, the sixth strain sensor 120 supplies a sixth sensor signal S120, the seventh strain sensor 122 supplies a seventh sensor signal S122 and the eighth strain sensor 124 supplies an eighth sensor signal S124.

In the invention, the mechanical load on the rolling element bearing 102 is determined from the deformation of the rolling element bearing 102 as follows.

The local deformation caused by the rolling contact forces that the rolling elements exert is used to determine an average contribution to the mechanical load in order to average out the effect on the deformation as a result of the spread in diameter of the rolling elements of the rolling element bearing 102. The rolling contact forces are the forces exerted by the rolling elements on the inner ring 104 and on the outer ring 106. A deformation sensor at a specific location on the inner ring 104 or the outer ring 106 will register a temporal deformation pattern that is more or less repeated with the passing of the rolling elements. In the configuration of the example shown, the deformation caused by the rolling contact forces is registered at the outer ring 106. An amplitude of the repetitive deformation as registered by the deformation sensor is representative of the load on the rolling element bearing 102. The amplitude registered at the location of the deformation sensor is averaged over a number of passings of the rolling elements.

On the other hand, the global deformation of the rolling element bearing 102 is determined in order to calculate a dynamic contribution to the mechanical load. The dynamic contribution takes into account the variations of the mechanical load on the relevant time-scales that have been omitted from the average contribution as a result of the averaging operation on the local amplitudes registered. The total mechanical load is the sum of the average contribution and the dynamic contribution.

Figure 2:
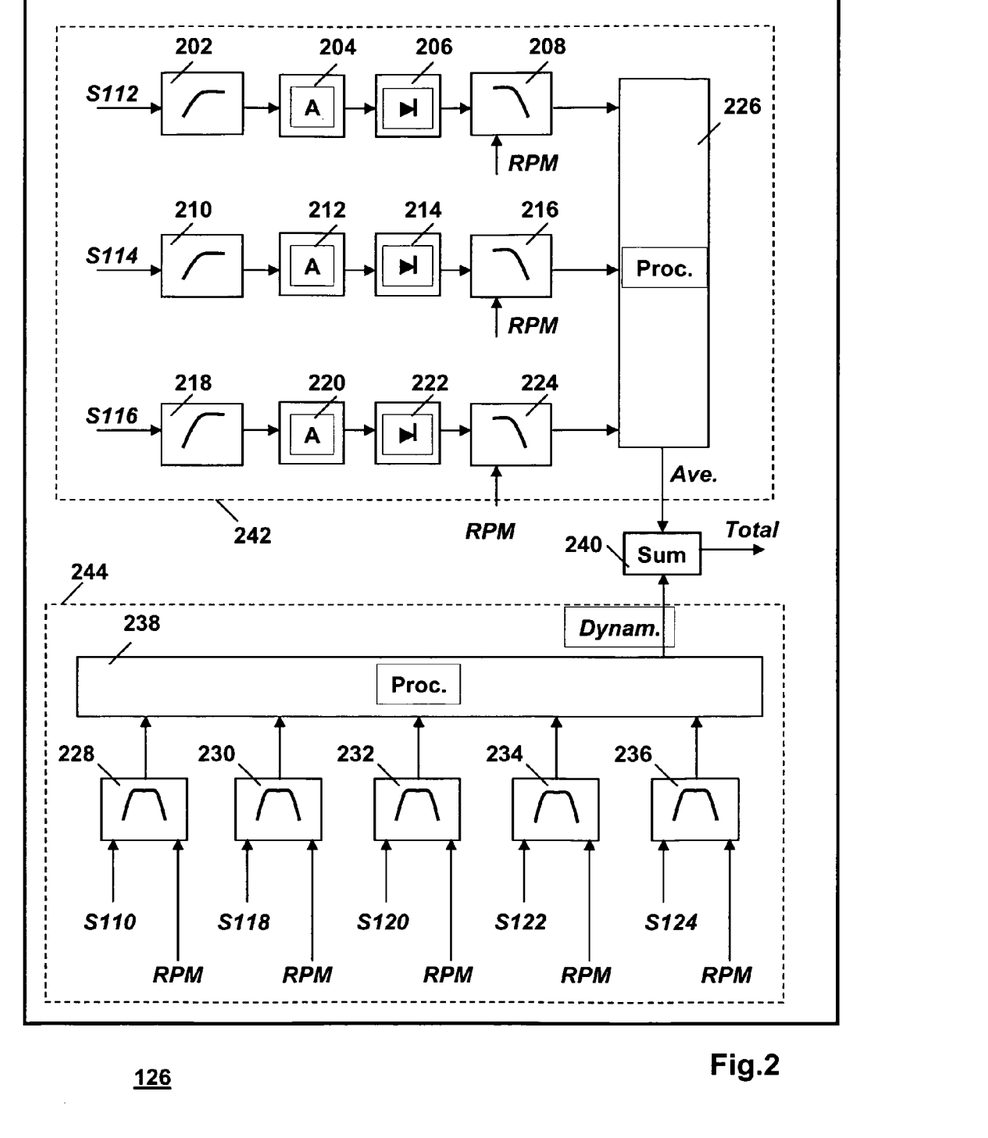
FIG. 2 is a block diagram of an implementation of a load determining system in the invention.

To explain this is more detail, reference is now made to FIG. 2. FIG. 2 is a block diagram of the load determining system 126 in the machine 100.

Average Load

The average contribution to the load, measured at least at one specific location at the inner ring 104 or the outer ring 106, is determined as follows. The impact of each individual one of the rolling elements of the rolling element bearing 102 causes local deformation at a specific location at the inner ring 104 or at the outer ring 106, when the individual rolling element passes the specific location. A specific one of the plurality of strain sensors accommodated at this specific location senses the local deformation. This temporal and spatial character of the deformation is determined by the mechanical load carried by the rolling element bearing 102, by the speed at which the cage revolves and by the number of the rolling elements in the cage.

The speed of revolution of the cage is representative of the ball-pass frequency. The local deformation has a temporal repetitive pattern as a result of the repetitive passing of the rolling elements. The amplitude of the repetitive sensor signal supplied by the specific strain sensor is considered proportional to the force on the rolling element of the rolling element bearing 102 that passes the specific location of the specific one of the plurality of sensors. Combining the individual force vectors as measured by individual ones of the deformation sensors results in the total force on the rolling element bearing 102.

In the example shown, the second sensor signal S112, the third sensor signal S114 and the fourth sensor signal S116 are involved in determining the average contribution. To this end, the second sensor signal S112, the third sensor signal S114 and the fourth sensor signal S116 are supplied to a first signal processing path 242 for being processed as follows. The second sensor signal S112 is supplied to a first high-pass filter 202 to remove the DC component from the second sensor signal S112. An output of the first high-pass filter 202 is connected to a first amplifier 204 for amplifying the high-pass filtered second sensor signal S112. An output of the first amplifier 204 is connected to a first rectifier 206 in order to rectify the amplified and high-pass filtered second sensor signal S112. The first rectifier 206 comprises, e.g., a full-wave rectifier. The first rectifier 206 converts the amplified and high-pass filtered second sensor signal S112 to a waveform of constant polarity. The amplitude of the waveform of constant polarity is proportional to the load on the passing rolling element. An output of the first rectifier 206 is connected to a first low-pass filter 208. The first low-pass filter 208 acts as an integrator for determining an average value or the root-mean-square (rms) value of the amplitude. The integration is conducted over a time-period of, e.g., a second if the rolling element bearing 102 is running at a few hundred revolutions per minute (RPM). That is, the low-pass cut-off frequency of the first low-pass filter 208 is about 1 Hz at that speed. An output of the first low-pass filter 208 is connected to a first input of a first signal processor 226.

Similarly, the third sensor signal S114 is supplied to the first signal processor 226 via a cascade of a second high-pass filter 210, a second amplifier 212, a second rectifier 214 and a second low-pass filter 216; and the fourth sensor signal S116 is supplied to the first signal processor 226 via a cascade of a third high-pass filter 218, a third amplifier 220, a third rectifier 222 and a third low-pass filter 224. An output of the second low-pass filter 216 and an output of the third low-pass filter 224 are connected to a second input and a third input, respectively, of the first signal processor 226. The cut-off frequency of the second low-pass filter 216 and the cut-off frequency of the third low-pass filter 224 are each substantially equal to the cut-off frequency of the first low-pass filter 208.

The first signal processor 226 determines the force on the rolling element bearing 102 at the location of the second strain sensor 112, the force on the rolling element bearing 102 at the location of the third strain sensor 114 and the force on the rolling element bearing 102 at the location of the fourth strain sensor 116. The first signal processor 226 then determines the vector sum of the individual forces thus determined and outputs a signal indicative of the total average force. It is well known in the art how to determine the forces from the strain resulting from rolling contact forces, see, e.g., SKF Ball Bearing Journal, Vol. 225, 1985, pp 19-25 or SKF Ball Bearing Journal Vol. 240, 1992, pp. 2-9, and U.S. Pat. No. 7,444,888 discussed above.

In determining the average contribution to the load on the rolling element bearing 102, the low-pass filtering, as performed by the first low-pass filter 208, the second low-pass filter 216 and the third low-pass filter 224, causes the amplitudes of the rectified wave patterns to average out, in order to remove high-frequency contributions stemming from, e.g., among other things, the spread in the diameter of the rolling elements as discussed earlier.

In case the speed, at which the rolling element bearing 102 is running, varies in operational use of the machine 100, the speed or the ball-pass frequency is then used to tune the cut-off frequencies of the first low-pass filter 208, the second low-pass filter 216 and the third low-pass filter 224. Thus, it is ensured that the averaging of the amplitudes, carried out in the first low-pass filter 208, the second low-pass filter 216 and the third low-pass filter 224, is performed over at least one complete revolution of the cage past the locations of the second strain sensor 112, the third strain sensor 114 and the fourth strain sensor 116.

Dynamic Load

The above procedure to determine the average contribution to the load on the rolling element bearing 102 is based on sensing the local deformation as a result of the rolling contact forces. However, the above procedure limits the bandwidth of the sensor signals S112, S114 and S116 and ignores the dynamic changes in the load with frequencies above the low-pass cut-off frequency of the first low-pass filter 208, of the second low-pass filter 216 and of the third low-pass filter 224. The contribution to the load on the rolling element bearing 102 in the frequency range beyond the low-pass cut-off frequency is now referred to as the dynamic contribution.

Another way is now considered to determine the load on the rolling element bearing 102. Another procedure is now used, based on sensing the strain, in order to determine the global deformation of the rolling element bearing 102, e.g., as disclosed in U.S. Pat. No. 7,389,701 discussed above. This other procedure considered here is based on deriving the forces on the rolling element bearing by analyzing the deformation of the inner ring 104 and/or of the outer ring 106 as a whole.

This other procedure, however, preferably distinguishes global deformation driven by a mechanical load on the rolling element bearing 102 from global deformation, driven by a thermal load on the rolling element bearing 102. Forces exerted on a physical object cause the physical object to be subjected to local compressions and/or local expansions that give rise to a global deformation of the physical object with respect to the shape of the physical object in a reference state. Similarly, a temperature gradient within the physical object or a change in temperature of the physical object cause local thermal expansion and/or local thermal contraction, that produce global deformation of the physical object with respect to a reference state of the physical object.

An important factor that determines the thermal load on the rolling element bearing 102 in operational use is the heat generated by the friction that occurs in the zone of the inner ring 104 and/or the outer ring 106 that is being subjected to the mechanical load.

In a practical context of using the invention, the global deformation of the rolling element bearing 102 as a result of a thermal load is a low-frequency effect. That is, the global deformation as a result of applying a thermal load is characterized by a timescale of, say, many seconds, e.g., 10 or 20 seconds. This timescale depends on the material properties of the inner ring 104 and the outer ring 106. For example, the rate at which heat is conducted through the inner ring 104 or through the outer ring 106 is determined by the thermal conductivity of the material of the inner ring 104 and of the outer ring 106.

The low-frequency character of the thermal load effects suggests that these thermal load effects can be removed from the time-varying global deformation by means of applying a high-pass filter to the sensor signals that are used to determine the global deformation.

In the example of the signal processing system 126 illustrated in FIG. 2, the second sensor signal S112, the third sensor signal S114 and the fourth sensor signal S116 are processed to determine the average contribution to the mechanical load on the rolling element bearing 102, as discussed above. The first sensor signal S110, the fifth sensor signal S118, the sixth sensor signal S120, the seventh sensor signal S122 and the eighth sensor signal S124 are supplied to a second signal processing path 244 for being processed to determine the dynamic contribution to the mechanical load. This approach is viable if, for example, the second strain sensor 112, the third strain sensor 114 and the fourth strain sensor 116 each have a configuration that is different from the one of the first strain sensor 110, the fifth strain sensor 118, the sixth strain sensor 120, the seventh strain sensor 122 and the eighth strain sensor 124. For example, the second strain sensor 112, the third strain sensor 114 and the fourth strain sensor 116 are configured to sense the rapidly fluctuating deformation in a relatively small area, the deformation being driven by the passing of the individual ones of the rolling elements. On the other hand, the first strain sensor 110, the fifth strain sensor 118, the sixth strain sensor 120, the seventh strain sensor 122 and the eighth strain sensor 124 are configured to sense the global deformation of the inner ring and/or the outer ring and may be sensing the strain in a larger area to benefit from the aggregate effect of local deformations.

If, however, the configuration of the plurality of strain sensors is uniform, the first sensor signal S110, the second sensor signal S112, the third sensor signal S114, the fourth sensor signal S116, the fifth sensor signal S118, the sixth sensor signal S120, the seventh sensor signal S122 and the eighth sensor signal S124 can be used to determine both the average contribution to the load as well as the dynamic contribution to the load, depending on the way wherein the sensor signals are processed.

In the example shown in FIG. 2, the first sensor signal S110, the fifth sensor signal S118, the sixth sensor signal S120, the seventh sensor signal S122 and the eighth sensor signal S124 are used to determine the dynamic contribution to the load on the rolling element bearing 102. The first sensor signal S110 is band-pass filtered in a first band-pass filter 228. The lower cut-off frequency of the first band-pass filter 228 is substantially equal to the cut-off frequency of each of the first low-pass filter 208, the second low-pass filter 216 and the third low-pass filter 224. This ensures that the average contribution to the load and the dynamic contribution to the load, in a frequency range which contains the cut-off frequency, common to the first low-pass filter 208, the second low-pass filter 216, the third low-pass filter 224 and the first band-pass filter 228, can be summed without introducing severe errors as a result of duplicating or omitting contributions to the total load falling within this frequency range. The lower cut-off frequency of the first band-pass filter 228 also implies that contributions to a global deformation of the rolling element bearing as a result of thermal expansion, such as caused by friction, as thermal effects have a characteristic timescale of many seconds. The higher cut-off frequency of the first band-pass filter 228 is substantially lower than the ball-pass frequency in operational use of the rolling element bearing.

Similarly, the fifth sensor signal S118 is band-pass filtered in a second band-pass filter 230. The lower cut-off frequency of the second band-pass filter 230 is substantially equal to the lower cut-off frequency of the first band-pass filter 228. The sixth sensor signal S120 is band-pass filtered in a third band-pass filter 232. The lower cut-off frequency of the third band-pass filter 232 is substantially equal to the lower cut-off frequency of the first band-pass filter 228. The seventh sensor signal S122 is band-pass filtered in a fourth band-pass filter 234. The lower cut-off frequency of the fourth band-pass filter 234 is substantially equal to the lower cut-off frequency of the first band-pass filter 228. The eighth sensor signal S124 is band-pass filtered in a fifth band-pass filter 236. The lower cut-off frequency of the fifth band-pass filter 236 is substantially equal to the lower cut-off frequency of the first band-pass filter 228.

The lower cut-off frequency of the first band-pass filter 228 brings about the removal of the signal components of the first sensor signal S110 that lie in the frequency range taken already into account in the determining of the average contribution. This removal ensures that the average contribution to the load and the dynamic contribution to the load, in a frequency range which contains the common cut-off frequency, can be summed without introducing severe errors as a result of duplicating or omitting contributions falling within this frequency range. The lower-cut-off frequency of the first band-pass filter 228 also causes removal of the contribution to a global deformation of the rolling element bearing 102 as a result of thermal expansion or thermal contraction, such as caused by friction. Such thermal effects have a characteristic timescale of many seconds. Also, the first sensor signal S110 needs to be filtered so as to remove the signal components with frequencies in the order of the ball-pass frequency and above. Accordingly, a higher cut-off frequency of the first band-pass filter 228 is chosen to be well lower than the ball-pass frequency, in order to remove the latter signal components. The higher cut-off frequency of the first band-pass filter 228 is taken as, e.g., 10 Hz in above example relating to the suspension system of the wheeled vehicle.

Similarly, the fifth sensor signal S118 is band-pass filtered in a second band-pass filter 230. The second band-pass filter 230 has a lower cut-off frequency substantially equal to the lower cut-off frequency of the first band-pass filter 228, and a higher cut-off frequency substantially equal to the higher cut-off frequency of the first band-pass filter 228. The sixth sensor signal S120 is band-pass filtered in a third band-pass filter 232. The third band-pass filter 232 has a lower cut-off frequency substantially equal to the lower cut-off frequency of the first band-pass filter 228, and a higher cut-off frequency substantially equal to the higher cut-off frequency of the first band-pass filter 228. The seventh sensor signal S122 is band-pass filtered in a fourth band-pass filter 234. The fourth band-pass filter 234 has a lower cut-off frequency substantially equal to the lower cut-off frequency of the first band-pass filter 228, and a higher cut-off frequency substantially equal to the higher cut-off frequency of the first band-pass filter 228. The eighth sensor signal S124 is band-pass filtered in a fifth band-pass filter 234. The fifth band-pass filter 234 has a lower cut-off frequency substantially equal to the lower cut-off frequency of the first band-pass filter 228, and a higher cut-off frequency substantially equal to the higher cut-off frequency of the first band-pass filter 228.

The first band-pass filter 228, the second band-pass filter 230, the third band-pass filter 232, the fourth band-pass filter 232 and the fifth band-pass filter 234 have a respective output connected to a second signal processor 238. The second signal processor 238 determines the dynamic contribution to the total load on the rolling element bearing 102 from the input signals received: the band-pass filtered first sensor S110, the band-pass filtered fifth signal S118, the band-pass filtered sixth signal S120, the band-pass filtered seventh signal S122 and the band-pass filtered eight signal S124. The second signal processor 238 determines the global deformation of the rolling element bearing 102 from the input signals received, and then determines the dynamic contribution to the total load from the global deformation. A method to accomplish this has been described in, e.g., U.S. Pat. No. 7,389,701, discussed above.

In case the speed, at which the rolling element bearing 102 is running, varies in operational use of the machine 100, the cut-off frequencies of the first band-filter 228, the second band-pass filter 230, the third band-pass filter 232, the fourth band-pass filter 234 and the fifth band-pass filter 236 are controlled in dependence on the ball-pass frequency. Thus, the lower cut-off frequencies of the first band-filter 228, the second band-pass filter 230, the third band-pass filter 232, the fourth band-pass filter 234 and the fifth band-pass filter 236 remain substantially identical to the cut-off frequencies of the first low-pass filter 208, the second low-pass filter 216 and the third low-pass filter 224. Likewise, control of the higher cut-off frequencies of the first band-filter 228, the second band-pass filter 230, the third band-pass filter 232, the fourth band-pass filter 234 and the fifth band-pass filter 236 in dependence on the speed, ensures that the higher cut-off frequencies remain well below the ball-pass frequency.

Total Load

The total load is now the combination of the average contribution, as determined by the first signal processor 226, and the dynamic contribution, as determined by the second signal processor 238. A first output of the first signal processor 226 and a second output of the second signal processor 238 are connected to a summing component 240 for linearly combining the average contribution and the dynamic contribution to give the total load on the rolling element bearing 102.

Cut-Off Frequencies

Figure 3:
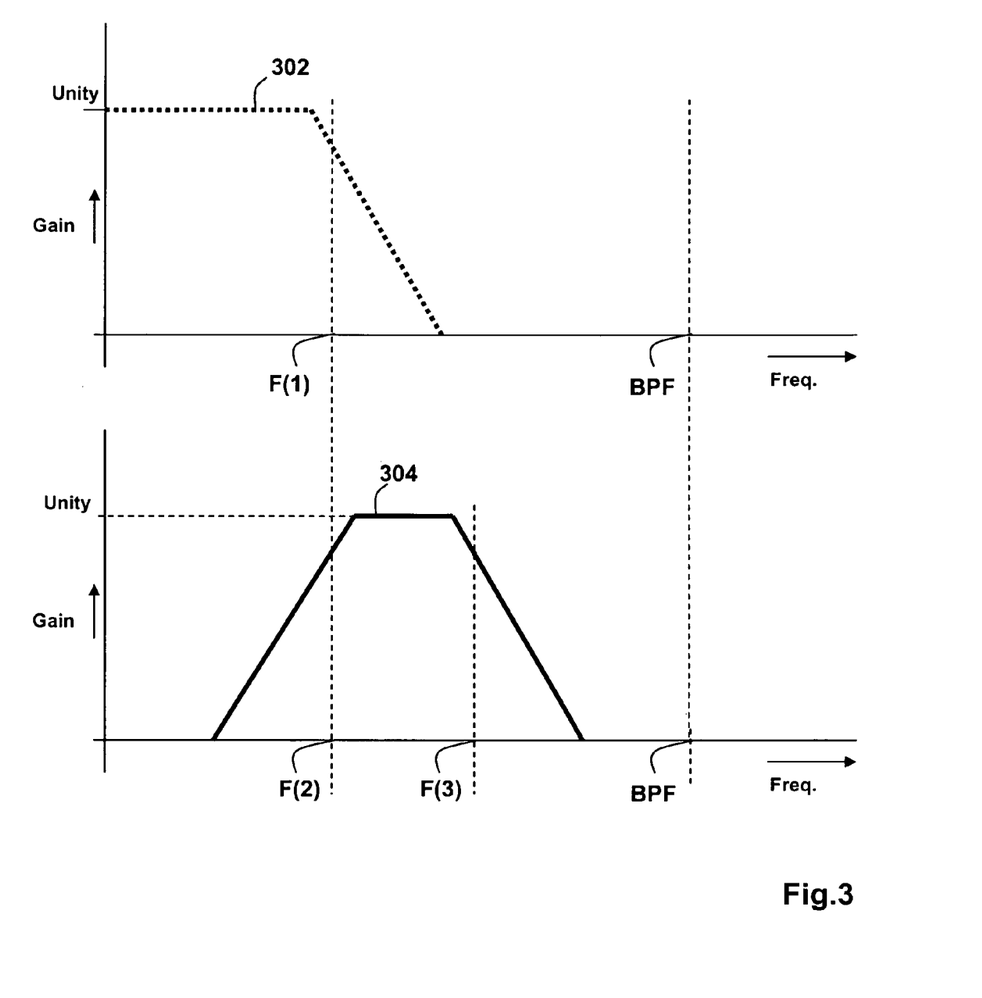
FIG. 3 shows examples of gain-frequency diagrams foe the filtering operations in the invention.

Reference is now made to FIG. 3. FIG. 3 is a diagram showing an example of a gain-frequency response 302 of a low-pass filter, being any of the first low-pass filter 208, the second low-pass filter 216 and the third low-pass filter 224. The low-pass filter of the example is a passive filter and has a first cut-off frequency F(1), usually defined as the frequency of the low-pass filter at which the gain has dropped by 3 dB with respect to the unit nominal gain. FIG. 3 also shows an example of a gain-frequency response 304 of a band-pass filter, being any of the first band-pass filter 228, the second band-pass filter 230, the third band-pass filter 232, the fourth band-pass filter 234 and the fifth band-pass filter 236. The band-pass filter of the example is a passive filter and has a second cut-off frequency F(2) and a third cut-off frequency F(3). The second cut-off frequency F(2) indicates the frequency, at which the gain has dropped to a level of 3 dB below the unity gain with decreasing values of the frequency. The third cut-off frequency F(3) indicates the frequency, at which the gain has dropped to a level of 3 dB below the unity gain with increasing values of the frequency. In the invention, the first cut-off frequency F(1) of the low-pass filter is set to be substantially equal to the second cut-off frequency F(2) of the band-pass filter. The second cut-off frequency F(2) is lower than the third cut-off frequency F(3). The third cut-off frequency is set to be substantially lower than the ball-pass frequency BPF, as explained above. In case the ball-pass frequency BPF varies in operational use of the rolling element bearing 102, the first cut-off frequency F(1), the second cut-off frequency F(2) and the third cut-off frequency F(3) are made dependent on the ball-pass frequency BPF, as explained above.

Each respective one of the first band-pass filter 228, the second band-pass filter 230, the third band-pass filter 232, the fourth band-pass filter 234 and the fifth band-pass filter 236 can be implemented using a combination of a respective further low-pass filter, having a low-pass cut-off frequency, followed by a respective further high-pass filter, having a high-pass cut-off frequency. The high-pass cut-off frequency of each respective further high-pass filter is then made equal to the low-pass cut-off frequency of each of the first low-pass filter 208, the second low-pass filter 216 and the third low-pass filter 224. Note that a specific high-pass filter can be implemented by a transfer function of unity minus a transfer function of a specific low-pass filter. The sum of the transfer function of the specific high-pass filter and the transfer function of the specific low-pass filter is unity. The specific high-pass filter and the specific low-pass filter form then a pair of so-called complementary filters.

Implementations

The first signal processor 226 and the second signal processor 238 can be implemented in a variety of manners. For example, the first signal processor 226 and the second signal processor 238 are implemented as dedicated pieces of hardware, e.g., dedicated electronic circuits, designed for use with a specific type of rolling element bearing 102 or for specific applications. Different types of rolling element bearing 102 may deform differently under the same load. The first signal processor 226 and the second signal processor 238 process their input signals according to the specific manner wherein a specific type of rolling element bearing 102 deforms. Similarly, use of a specific type of rolling element bearing 102 in different applications may give rise to different loads. The processing by the first signal processor 226 and the second signal processor 238 may then have been tailored to the specific load range anticipated.

Alternatively, at least one of the first signal processor 226 and the second signal processor 238 is programmable, e.g., by the end-user, with regard to the specific type of rolling element bearing 102, whose deformation is to be processed in order to obtain the load on the rolling element bearing 102, and/or to a specific load range.

Alternatively, the first signal processor 226, the second signal processor 238 and the summing component 240 are physically formed by a single signal processor, e.g., tailored to a specific type of rolling element bearing 102 and/or to a specific load range, or programmable for use with a range of different types of rolling element bearing 102 and/or with different load ranges.

Alternatively, at least one of the first signal processor 226, the second signal processor 238 and the summing component 240 is implemented in software stored on a computer-readable medium and running on a general-purpose computer. Furthermore, the operations carried out by one or more of the following components could as well be implemented in software running on a general purpose computer: the first high-pass filter 202, the second high-pass filter 210, the third high-pass filter 218, the first amplifier 204, the second amplifier 212, the third amplifier 220, the first rectifier 206, the second rectifier 214, the third rectifier 222, the first low-pass filter 208, the second low-pass filter 216, the third low-pass filter 224, the first band-pass filter 228, the second band-pass filter 230, the third band-pass filter 232, the fourth band-pass filter 234 and the sixth band-pass filter 236.

Figure 4:
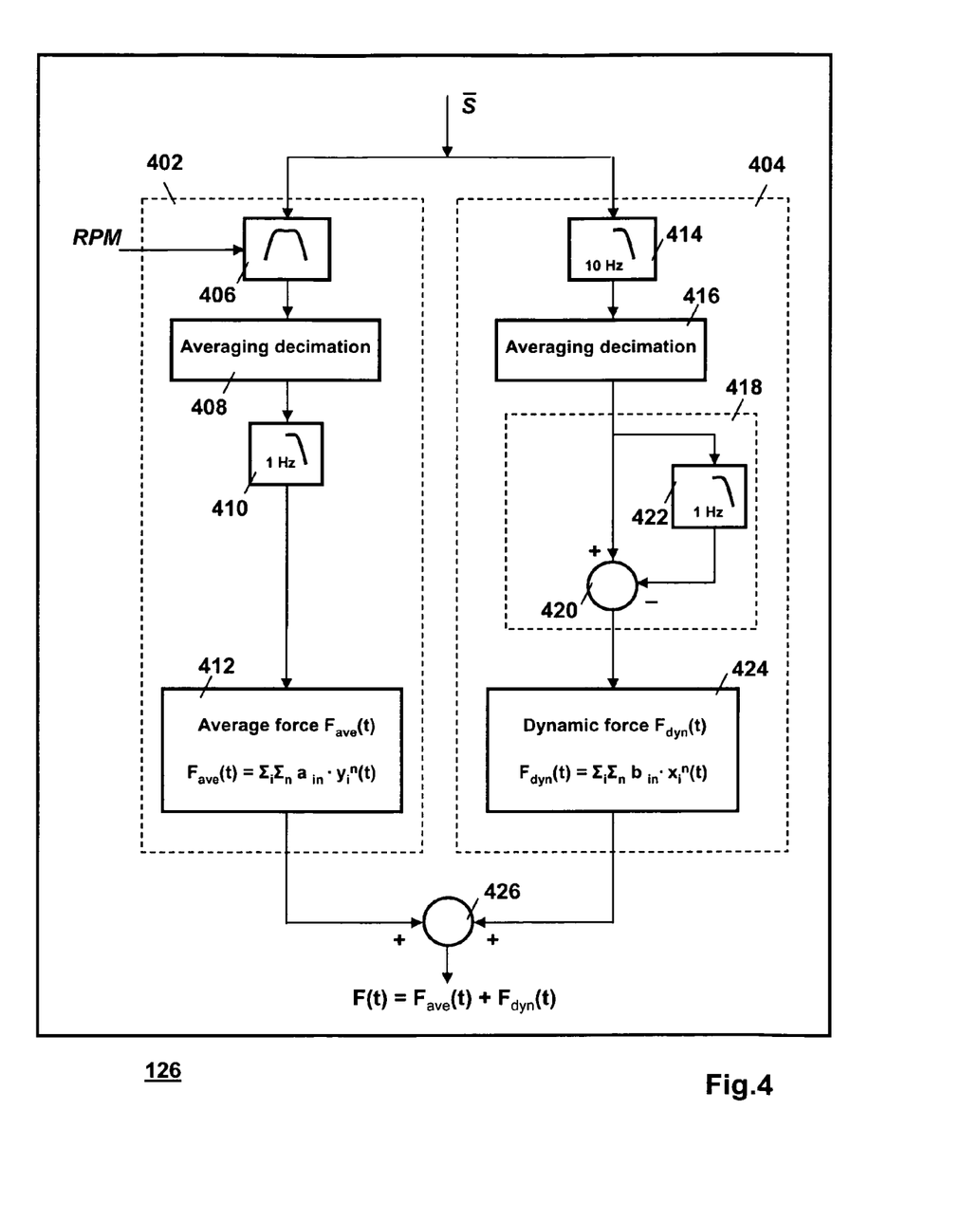
FIG. 4 is a diagram of another implementation of a load determining system in the invention.

FIG. 4 is a diagram of another implementation example of the load determining system 126. It is assumed here that the first sensor signal S110, the second sensor signal S112, the third sensor signal S114, the fourth sensor signal S116, the fifth sensor signal S118, the sixth sensor signal S120, the seventh sensor signal S122 and the eighth sensor signal S124 have been sampled with a clock frequency of, e.g., 1 kHz and have been converted to digital values. The sampled and digitized versions of the first sensor signal S110, the second sensor signal S112, the third sensor signal S114, the fourth sensor signal S116, the fifth sensor signal S118, the sixth sensor signal S120, the seventh sensor signal S122 and the eighth sensor signal S124 are the components of a sensor signal vector S. The sensor signal vector S is supplied to a first signal processing path 402 and to a second signal processing path 404.

The first signal processing path 402 comprises the operations involved in sensing the dynamic contribution to the load, using demodulation based on the ball-pass frequency and considering local deformations of the rolling element bearing 102 as a result of a passing rolling element. The ball-pass frequency is a measure of the number of revolutions per minute (RPM) of the rolling element bearing 102. The second signal processing path 404 comprises the operations involved in sensing the dynamic contribution to the load based on deriving the forces from the global deformation of the rolling element bearing 102.

The first signal processing path 402 comprises a first block 406 wherein samples of each individual one of the components of the sensor signal vector S are subjected to a band-pass filter operation. The samples of different components of the sensor signal vector S may be band-pass filtered in parallel or, alternatively, be subjected to a digital band-pass filter one after the other at a rate high enough compared to the sample rate of 1 kHz in the example above. The band-pass filter operation in the first block 406 is performed with a band-pass filter around the ball-pass frequency so as to extract the signal components of the sensor signal vector S relevant to the local deformation of the rolling element bearing 102 induced by the passing of each specific one of the rolling elements. After the components of the sensor signal vector S have been band-pass filtered in the first block 406, the components are subjected in a second block 408 to an averaging decimator operation in order to reduce the number of samples. For example, the average, e.g., the root-mean-square (RMS), per component of the sensor signal vector S is determined over, say, 50 temporally consecutive samples of the component as sensed. The averaging-decimated samples are supplied to a third block 410 wherein a low-pass filter is applied to the averaging-decimated samples using the cut-off frequency of 1 Hz in a scenario wherein the rolling element bearing 102 is running at a few hundred revolutions per minute (RPM), as discussed above with respect to the first low-pass filter 208, the second low-pass filter 216 and the third low-pass filter 224. The thus low-pass filtered samples are supplied to a fourth block 412.

The fourth block 412 calculates the average contribution to the forces on the basis of the samples supplied by the third block 410, representative of all components of the sensor signal vector S. In the example of FIG. 4, the samples represent the sensor signals from all strain gauges, i.e., the first sensor signal S110 from the first strain sensor 110, the second sensor signal S122 from the second strain sensor 112, the third sensor signal S114 from the third strain sensor 114, the fourth sensor signal S116 from the fourth strain sensor 116, the fifth sensor signal S118 from the fifth strain sensor 118, the sixth sensor signal S120 from the sixth strain sensor 120, the seventh sensor signal S122 from the seventh strain sensor 122 and the eighth sensor signal S124 from the eighth strain sensor 124. Note that each of the first sensor signal S110, the second sensor signal S112, the third sensor signal S114, the fourth sensor signal S116, the fifth sensor signal S118, the sixth sensor signal S120, the seventh sensor signal S122 and the eighth sensor signal S124 is representative of a respective displacement or strain as sensed. Within a linear approach, forces and strains are related through a stiffness matrix. The fourth block 412 then performs the matrix multiplication and produces a quantity representative of the average contribution to the force experienced by the rolling element bearing 102 at the relevant moment.

Generally, however, a non-linear relationship exists between, on the one hand, the average contribution to the force on the rolling element bearing 102 and, on the other hand the strains as represented by the first sensor signal S110, the second sensor signal S112, the third sensor signal S114, the fourth sensor signal S116, the fifth sensor signal S118, the sixth sensor signal S120, the seventh sensor signal S122 and the eighth sensor signal S124. Accordingly, a polynomial approach may be applied, wherein the average force on the rolling element bearing 102 is expressed as a linear combination of vectors, wherein the k-th component of the n-th vector has the value of the k-th sensor signal as supplied by the third block 410 and raised to the n-th power. To clarify this, the following notation is introduced. The average contribution to the total force exerted on the rolling element bearing 102 at a moment t is denoted by the vector $F_{ave}(t)$ and the k-th vector component of the vector $F_{ave}(t)$ is denoted by $F_{ave,k}(t)$. The value of the i-th one of the first sensor signal S110, the second sensor signal S112, the third sensor signal S114, the fourth sensor signal S116, the fifth sensor signal S118, the sixth sensor signal S120, the seventh sensor signal S122 and the eighth sensor signal S124, as supplied by the third block 410 at the moment t is denoted by $y_i(t)$. Then, $F_{ave,k}(t)$ is expressed as:

$$F_{ave,k}(t) = \Sigma_j \Sigma_m a_{(kjm)} \cdot [y_j(t)]^m,$$

wherein the coefficients $a_{(kjm)}$ represent the respective weighting factors. Accordingly, the first two terms of above linear combination give then:

$$F_{ave,k}(t) = \Sigma_j a_{(kj1)} \cdot [y_j(t)] + \Sigma_j a_{(kj2)} \cdot [y_j(t)]^2$$

The band-pass filtering in the first block 406 is preferably made dependent on the rotation speed of the rolling element bearing 102 so as to be able to extract the information about the locally induced deformation in a scenario wherein the rotation speed varies.

The samples of the sensor signal vector S are also supplied to the second signal processing path 404. The second signal processing path 404 comprises a fifth block 414, wherein the components of the sensor signal vector S are subjected to a low-pass filtering operation with a cut-off frequency of 10 Hz. This removes the frequencies in the range of the ball-pass frequency that have already been taken into account at the first block 406 in the first signal processing path 402. The thus low-pass filtered samples are supplied from the fifth block 414 to a sixth block 416. The sixth block 416 subjects the received samples to an averaging decimator operation in order to reduce the number of samples. For example, the average, e.g., the root-mean-square (RMS), per component of the sensor signal vector S is determined over, say, 50 temporally consecutive samples of the component as sensed. This averaging decimator operation at the sixth block 416 is similar to the one carried out at the second block 408 in the first signal processing path 402. The sixth block 416 supplies the averaging-decimated samples to a seventh block 418. The seventh block 418 implements a high-pass filtering operation with a cut-off frequency of 1 Hz. The cut-off frequency of the high-pass filtering operation is the same as the cut-off frequency of the low-pass filtering operation in the third block 410 of the first signal processing path 402. The high-pass filtering operation in the seventh block 418 is implemented in a specific manner.

The high-pass filtering operation of the seventh block 418 is implemented by means of a subtractor 420. The subtractor 420 subtracts from the averaging-decimated samples, as received from the sixth block 416, low-pass filtered versions of the averaging-decimated samples. That is, the high-pass filtering in the seventh block 418 is implemented by supplying the averaging-decimated samples in parallel to the subtractor 420 and to a low-pass filter 422 and by subtracting the low-pass filtered, averaging-decimated samples from the averaging-decimated samples. The low-pass filtering operation at low-pass filter 422 is the same operation as the low-pass filtering operation in the third block 410 of the first signal processing path 402. Note that the presence of the low-pass filtering in the third block 410 of the first signal processing path 402 gives rise to a relatively slowly responding average contribution to the total force. The slowly responding part is removed from the samples processed in the second signal processing path 404. The samples supplied by the seventh block 418 now represent the transient phenomena and effectively mimic a contribution to the total force that is the complement to the average contribution. This complementary contribution represents the dynamic contribution to the total force.

The dynamic contribution to the total force is calculated in an eight block 424. Within a linear approach, the forces and strains are related through a stiffness matrix. The eighth block 424 then performs the matrix multiplication and produces a quantity representative of the dynamic contribution to the force exerted on the rolling element bearing 102 at the relevant moment.

Similarly as discussed with respect to the average contribution to the force of the rolling element bearing 102, a non-linear relationship generally exists between, on the one hand, the dynamic contribution to the force on the rolling element bearing 102 and, on the other hand the strains as represented by the first sensor signal S110, the second sensor signal S112, the third sensor signal S114, the fourth sensor signal S116, the fifth sensor signal S118, the sixth sensor signal S120, the seventh sensor signal S122 and the eighth sensor signal S124. Accordingly, a polynomial approach may be applied, wherein the dynamic force on the rolling element bearing 102 is expressed as a linear combination of vectors, wherein the k-th component of the n-th vector has the value of the k-th sensor signal as supplied by the seventh block 418 and raised to the n-th power. The dynamic contribution to the total force exerted on the rolling element bearing 102 at a moment t is denoted by the vector $F_{dyn}(t)$ and the k-th vector component of the vector $F_{dyn}(t)$ is denoted by $F_{dyn,k}(t)$. The value of the i-th one of the first sensor signal S110, the second sensor signal S112, the third sensor signal S114, the fourth sensor signal S116, the fifth sensor signal S118, the sixth sensor signal S120, the seventh sensor signal S122 and the eighth sensor signal S124, as supplied by the seventh block 418 at the moment t is denoted by $x_t(t)$. Then, $F_{dyn,k}(t)$ is expressed as:

$$F_{dyn,k}(t) = \Sigma_j \Sigma_m b_{(kjm)} \cdot [x_j(t)]^m,$$

wherein the coefficients $b_{(kjm)}$ represent the respective weighting factors. Accordingly, the first two terms of above linear combination give then:

$$F_{dyn,k}(t) = \Sigma_j b_{(kj1)} \cdot [x_j(t)] + \Sigma_j b_{(kj2)} \cdot [x_j(t)]^2$$

The average contribution $F_{ave}$ to the force, as determined by the fourth block 412, and the dynamic contribution $F_{dyn}$ to the force, as determined by the eighth block 424, are combined in an adder 426 so as to determine the total force, a vector F(t), as experienced by the rolling element bearing 102 at the relevant moment "t".

The characteristic frequency of deformations of the rolling element bearing 102 as a result of a temperature gradient, is lower than 1 Hz, i.e., lower than the cut-off frequency of the 1 Hz filtering at the third block 410 and at the seventh block 418. Accordingly, deformations as a result of thermal effect are largely filtered out.

The invention claimed is:

1. A machine comprising:
a rolling element bearing,
a sensor system, and a load determining system, wherein
the rolling element bearing includes an inner ring, an outer ring and a plurality of rolling elements accommodated between the inner ring and the outer ring; wherein
the sensor system being configured for sensing a local deformation of at least a particular one of the inner ring and the outer ring at at least a specific location on the particular one of the inner ring and the outer ring, and for supplying a sensor output representative of the sensing; wherein
the load determining system being configured for:
receiving the sensor output from the sensor system; and
determining a mechanical load on the rolling element bearing in dependence on the sensor output, when the inner ring and the outer ring are coaxially rotating relative to one another; wherein
the load determining system comprises:
a first signal path configured for processing the sensor output for determining an average contribution to the mechanical load;
a second signal path configured for processing the sensor output for determining a dynamic contribution to the mechanical load; and a combiner for linearly combining the average contribution and the dynamic contribution;
the first signal path being configured for:
low-pass filtering the sensor output with a first cut-off frequency; and processing the low-pass filtered sensor output as representative of the local deformation induced by a passing of the rolling elements past the specific location so as to determine the average contribution indicative of a low-frequency variation in the local deformation;
the second signal path being configured for:
band-pass filtering the sensor output with a second cut-off frequency, substantially equal to the first cut-off frequency, and with a third cut-off frequency higher than the second cut-off frequency; and processing the band-pass filtered sensor output as representative of a global deformation of the rolling element bearing indicative of the dynamic contribution; and the first cut-off frequency, the second cut-off frequency and the third cut-off frequency are substantially lower than a ball-pass frequency.

2. The machine according to claim 1, wherein:
the sensor system having a first sensor and a second sensor, different from the first sensor; wherein
the first sensor supplies a first sensor signal and the second sensor supplies a second sensor signal; wherein
the sensor output provides the first sensor signal and the second sensor signal; and wherein
the first sensor signal being supplied to the second signal path and the second sensor signal is being supplied to the first signal path.

3. The machine according to claim 1, wherein:
the sensor system includes a sensor for supply of a sensor signal;
the sensor output provides the sensor signal;
the sensor signal being supplied to the first signal processing path and to the second signal processing path.

4. The machine according to claim 1, wherein:
the load determining system has an input for receiving a speed signal representative of the ball-pass frequency of the rolling element bearing in operational use of the machine, and
the load determining system controls the first cut-off frequency, the second cut-off frequency and the third high cut-off frequency in dependence on the ball-pass frequency.

5. A non-transitory computer-readable medium having a computer program product configured for implementing a load determining system, wherein:
the load determining system being configured for determining a mechanical load on a rolling element bearing, which has
an inner ring,
an outer ring and
a plurality of rolling elements accommodated between the inner ring and
the outer ring, when the inner ring and the outer ring are coaxially rotating relative to one another;
the load determining system being operative to determine the mechanical load under control of a sensor system configured for sensing a local deformation of at least a particular one of an inner ring and the outer ring at at least a specific location on the particular one of the inner ring and the outer ring and for supplying a sensor output representative of the sensing;
the non-transitory computer-readable medium comprises:
first instructions for implementing a first signal path configured for processing the sensor output for determining an average contribution to the mechanical load;
second instructions for implementing a second signal path configured for processing the sensor output for determining a dynamic contribution to the mechanical load; and
third instructions for implementing a combiner for linearly combining the average contribution and the dynamic contribution;
the first instructions comprise:
fourth instructions for implementing a low-pass filtering of the sensor output with a first cut-off frequency; and
fifth instructions for implementing a processing of the low-pass filtered sensor output as representative of the local deformation induced by a passing of the rolling elements past the specific location so as to determine the average contribution indicative of a low-frequency variation in the local deformation;

the second instructions comprise:

sixth instructions for implementing a band-pass filtering of the sensor output with a second cut-off frequency, substantially equal to the first cut-off frequency, and with a third cut-off frequency higher than the second cut-off frequency; and seventh instructions for implementing a processing of the band-pass filtered sensor output as representative of a global deformation of the rolling element bearing indicative of the dynamic contribution; and the first cut-off frequency, the second cut-off frequency and the third cut-off frequency are substantially lower than a ball-pass frequency.

6. The non-transitory computer-readable medium according to claim 5, wherein:

the sensor system provides a first sensor and a second sensor, different from the first sensor;

the first sensor supplies a first sensor signal and the second sensor supplies a second sensor signal;

the sensor output includes the first sensor signal and the second sensor signal;

the first sensor signal being processed by the second instructions and the second sensor signal being processed by the first instructions.

7. The non-transitory computer-readable medium according to claim 5, wherein:

the sensor system includes a sensor for supply of a sensor signal;

the sensor output provides the sensor signal;

the sensor signal being processed by the first instructions and by the second instructions.

8. The non-transitory computer-readable medium according to claim 6, comprising:

eighth instructions for receiving a speed signal representative of the ball-pass frequency of the rolling element bearing, and ninth instructions for control of the first cut-off frequency, the second cut-off frequency and the third high cut-off frequency in dependence on the ball-pass frequency.

9. A method of determining a mechanical load on a rolling element bearing, wherein:

the rolling element bearing having an inner ring, an outer ring and a plurality of rolling elements accommodated between the inner ring and the outer ring;

the method comprises:

sensing a local deformation of at least a particular one of the inner ring and the outer ring at at least a specific location on the particular one of the inner ring and the outer ring for generating a sensor output representative of the sensing; and determining the mechanical load on the rolling element bearing in dependence on the sensor output when the inner ring and the outer ring are coaxially rotating relative to one another;

the determining of the mechanical load comprises:

processing the sensor output for determining an average contribution to the mechanical load;

processing the sensor output for determining a dynamic contribution to the mechanical load; and linearly combining the average contribution and the dynamic contribution; the determining of the average contribution comprises:

low-pass filtering the sensor output with a first cut-off frequency; and processing the low-pass filtered sensor output as representative of the local deformation induced by a passing of the rolling elements past the specific location so as to determine the average contribution indicative of a low-frequency variation in the local deformation;

the determining of the dynamic contribution comprises:

band-pass filtering the sensor output with a second cut-off frequency, substantially equal to the first cut-off frequency, and with a third cut-off frequency higher than the second cut-off frequency; and processing the band-pass filtered sensor output as representative of a global deformation of the rolling element bearing indicative of the dynamic contribution;

and the first cut-off frequency, the second cut-off frequency and the third cut-off frequency are substantially lower than a ball-pass frequency.

10. The method according to claim 9, wherein:

the sensor system provides a first sensor and a second sensor, different from the first sensor;

the first sensor supplies a first sensor signal and the second sensor supplies a second sensor signal;

the processing of the sensor output for determining the average contribution includes processing the second sensor signal;

the processing of the sensor output for determining the dynamic contribution having processing the first sensor signal.

11. The method according to claim 9, wherein:

the sensor system provides a sensor for supply of a sensor signal;

the sensor output includes the sensor signal;

the processing of the sensor output for determining the average contribution having processing the first sensor signal and second sensor signal;

the processing of the sensor output for determining the dynamic contribution includes processing the first sensor signal and the second sensor signal.

12. The method according to claim 9, comprising:

receiving a speed signal representative of the ball-pass frequency of the rolling element bearing, and controlling of the first cut-off frequency, the second cut-off frequency and the third high cut-off frequency in dependence on the ball-pass frequency.

* * * * *